(12) United States Patent
Graber

(10) Patent No.: US 6,478,467 B1
(45) Date of Patent: Nov. 12, 2002

(54) ROLLER CAGE FOR A LONGITUDINAL GUIDING DEVICE, MOUNTED ON ROLLING BEARINGS

(75) Inventor: Martin Graber, Solothurn (CH)

(73) Assignee: Agathon AG Maschinenfabrik, Solothurn (CH)

( * ) Notice: Subject to any disclaimer, the term of this patent is extended or adjusted under 35 U.S.C. 154(b) by 0 days.

(21) Appl. No.: 09/438,919

(22) Filed: Nov. 12, 1999

(30) Foreign Application Priority Data

Nov. 13, 1998 (EP) ............................................. 98811133

(51) Int. Cl.⁷ ............................ F16C 29/04; F16C 33/52
(52) U.S. Cl. ........................................................ 384/51
(58) Field of Search ........................... 384/51, 572, 575, 384/580, 621, 623, 576

(56) References Cited

U.S. PATENT DOCUMENTS

| | | | | |
|---|---|---|---|---|
| 2,651,552 A | * | 9/1953 | Pitner | 384/51 |
| 3,163,478 A | * | 12/1964 | Pitner | 384/623 |
| 3,368,855 A | * | 2/1968 | Cowles et al. | 384/575 |
| 3,438,685 A | * | 4/1969 | Teufel | 384/575 |
| 3,582,161 A | | 6/1971 | Hudson | |
| 3,684,337 A | * | 8/1972 | Fransos et al. | 384/575 |
| 3,802,754 A | * | 4/1974 | Pitner | 384/580 |
| 4,208,078 A | * | 6/1980 | Miki | 384/572 |
| 4,429,922 A | | 2/1984 | Pfluger | |
| 4,664,534 A | | 5/1987 | Hanaway | |
| 5,716,140 A | | 2/1998 | Kondo et al. | |
| 6,068,406 A | * | 5/2000 | Yoshida et al. | 384/470 |

FOREIGN PATENT DOCUMENTS

EP 0 795 694 A2 3/1997

* cited by examiner

*Primary Examiner*—William C Joyce
(74) *Attorney, Agent, or Firm*—Pearne & Gordon LLP

(57) ABSTRACT

A roller cage for a longitudinal guiding device, mounted on rolling bearings, is provided with apertures in which rollers are inserted. The apertures have a substantially rectangular cross-section, which is formed by four side faces, and are machined down. On the inside edge region of each aperture, collar-shaped projections are provided which protrude out of the side faces. The outside edge region of the aperture is plastically deformed by pressing in, so that a protruding edge is formed. By means of the collar-shaped projections and the protruding edges the roller is held in the aperture, the collar-shaped projections and the protruding edges being designed such that they do not come into contact with the support region of the roller. The friction of the roller is thereby less; the life increases.

9 Claims, 3 Drawing Sheets

US 6,478,467 B1

ROLLER CAGE FOR A LONGITUDINAL GUIDING DEVICE, MOUNTED ON ROLLING BEARINGS

BACKGROUND OF THE INVENTION

This invention relates to a roller cage for a longitudinal guiding device, mounted on rolling bearings, with substantially continuous apertures made therein in which rollers are inserted for longitudinal leading of a guiding part in a guided part, in particular of guide pillars in bores of punching dies, tools for mold making or in general machine construction.

Roller cages of this type are known. Usually with roller cages of this kind the apertures for receiving the rollers are obtained by punching. Afterwards the rollers are inserted into the corresponding holes, after which the material of the roller cage is plastically deformed in the region of the inner and outer edge by pressing so that a protruding edge is formed, whereby the rollers are held in the apertures.

Owing to the punching out step for producing the apertures, the side faces, which border the apertures, have a certain roughness. The rollers are guided by these side faces. This means that the rollers come into contact with these side faces when the leading part is moved with respect to the led part. Because of the surface roughness of the side faces, the rollers are thus subjected to an abrasive wear and tear, on the rolling face as well as on the front faces. This reduces the life of the rollers, and thus the life of the longitudinal guiding device.

Putting the apertures in the roller cages by punching and plugging the inner and outer edge areas of the apertures after insertion of the rollers requires several operational steps. Inaccuracies can thereby occur, which can have as a consequence an imprecise placement of the roller. This leads to the roller not rolling exactly on the surfaces to be borne, whereby here, too, the abrasion is greater, which once again has an effect upon the life of longitudinal guiding devices of this kind. Through imprecise placement of the rollers in the apertures, the pressure of the roller surfaces on the side faces of the apertures also increases, which once again results in a faster attrition of the roller.

BRIEF SUMMARY OF THE INVENTION

The object of the present invention is therefore to design the apertures in the roller cage such that a more precise placement of the rollers inserted therein is achieved, whereby the attrition of the rollers and of the roller cage is reduced, and the life of correspondingly equipped longitudinal guiding devices is increased.

This object is achieved according to the invention through a roller cage for a longitudinal guiding device, mounted on rolling bearings, with substantially continuous apertures made therein in which rollers are inserted, wherein the apertures, which are machined down, have a substantially rectangular cross-section, formed by four side faces, and each side face forms an inside edge region and an outside edge region, and the inside edge region of each aperture has collar-shaped projections which protrude out of the side faces and which extend at least over part of the circumference of the aperture, and the outside edge region of the aperture is plastically deformed through pressing in along at least one part of two side faces which run parallel to the longitudinal axis of the roller such that a protruding edge is formed over the surface of the two side faces of the aperture.

The four corner regions of the aperture formed by the four side faces are preferably each provided with a recess, which could be designed semi-cylindrical, for example. Achieved thereby is that this region of the aperture cannot come into contact with the roller inserted in the aperture, whereby wear and tear on the roller can be reduced, in particular when it is provided with two cambered rolling surfaces, which are provided on the two end regions of the roller.

When using the above-mentioned rollers, it is preferable if the protruding edge running outside along the two sides is limited laterally in each case by the two recesses. Also avoided thereby is that this edge comes into contact with the bearing region of the respective roller, whereby abrasion is reduced. This applies also to the collar-shaped projections, which are provided along the two sides running parallel to the longitudinal axis of the roller, and which are also limited laterally by the recess provided in each corner region.

When rollers having a cambered surface are inserted into the apertures of the roller cage, it is preferable to dispose the collar-shaped projections in the region of the recesses, whereby their front edges run substantially in diagonal direction over the corner area. Achieved thereby is that the bearing region of this roller does not come into contact with the collar-shaped projections, whereby abrasion is reduced and the life thereby increased.

A further, additional advantage results if in the middle region of the two sides running parallel to the longitudinal axis of the roller a further recess is provided in the respective side faces in each case. Thereby prevented is contact between the bearing face of the roller and these two side faces. Achieved in addition is that the protruding region also has a respective recess.

The apertures in the roller cage are preferably designed such that they can be rough-drilled and obtained by milling in a one operational step, it being necessary to use just one milling tool. Putting the apertures in the roller cage is thereby simplified, which has a positive effect upon the precision and the economic efficiency.

BRIEF DESCRIPTION OF THE DRAWINGS

Embodiments of the invention will be described more closely in the following, by way of example, with reference to the accompanying drawings.

DETAILED DESCRIPTION OF THE INVENTION

Figure 1:
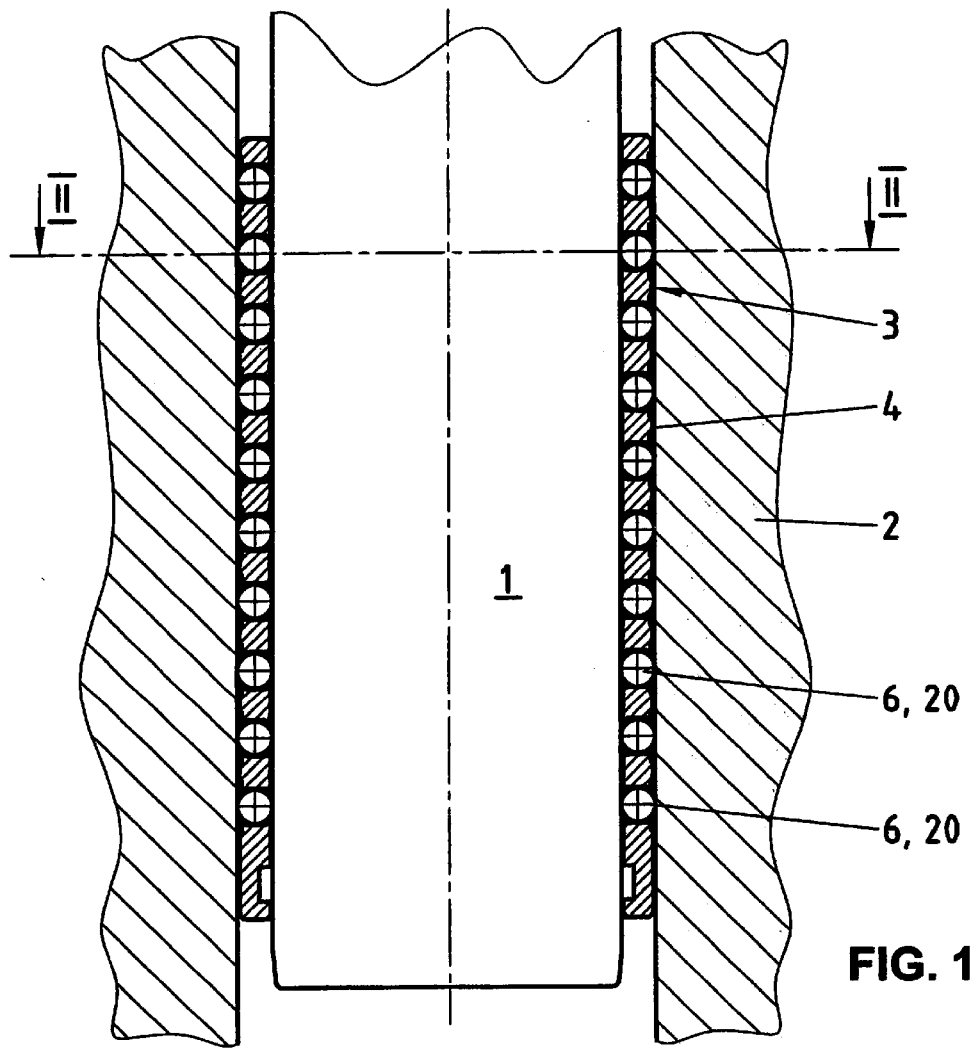
FIG. 1 shows a longitudinal section through a longitudinal guiding device with roller cage and rollers inserted therein.
Figure 2:
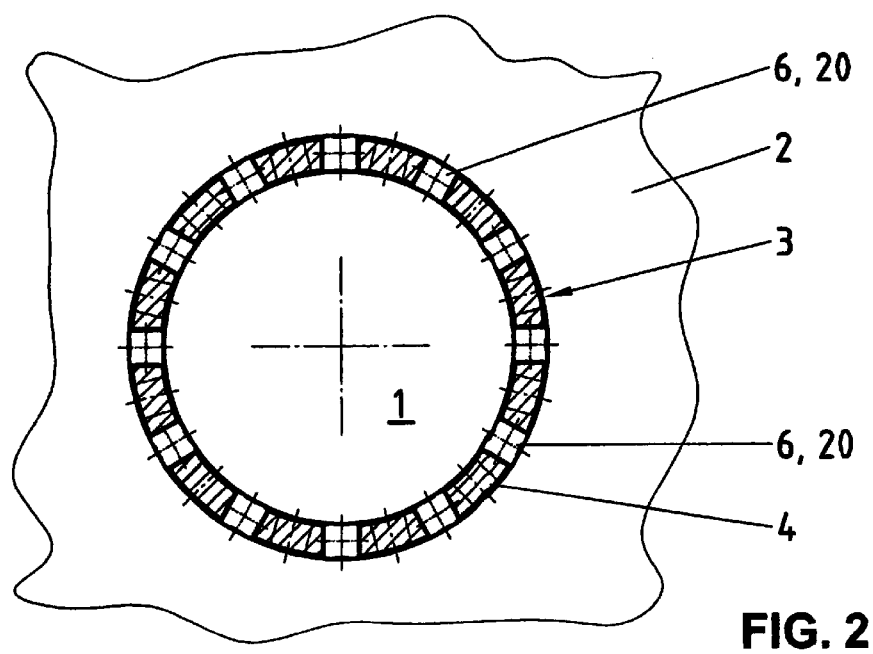
FIG. 2 is a section along line II—II through the longitudinal guiding device according to FIG. 1.

Visible in FIGS. 1 and 2 are a guide pillar 1 as the guiding part and a plate 2 as the guided part, for example of a tool for mold making, which is led by a longitudinal guiding device 3, mutually displaceable longitudinally. The longitudinal guiding device 3 comprises a roller cage 4, which is provided with apertures 5 and rollers 6 inserted therein. The apertures 5 are disposed in a known way substantially on surface lines of the hollow cylinder forming the roller cage 4, which are distributed over the circumference.

Figure 3:
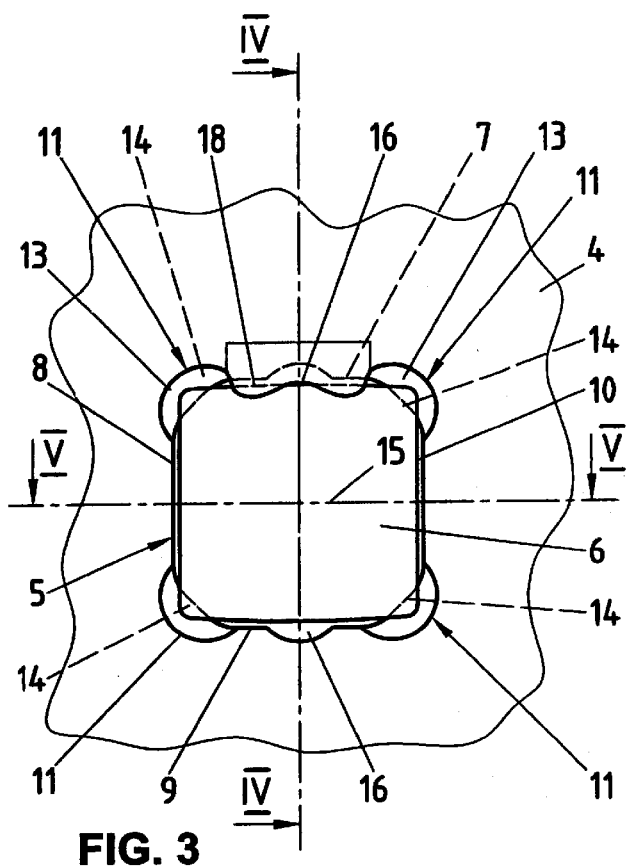
FIG. 3 is a top view of a detail of a first embodiment of a roller cage with an aperture and roller inserted therein.
Figure 4:
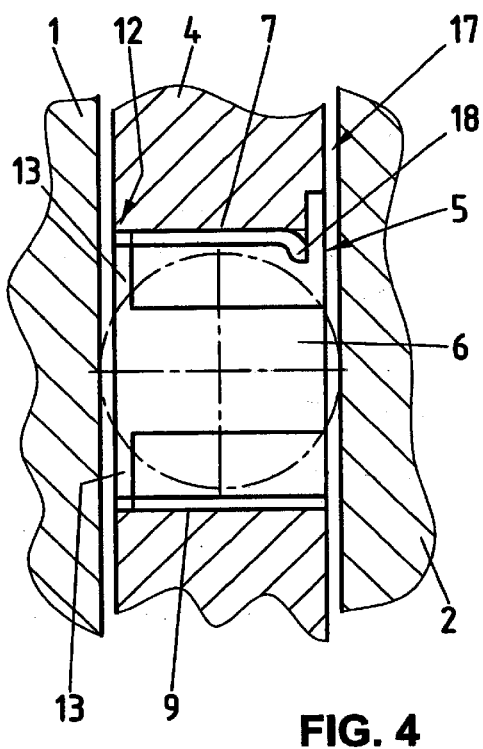
FIG. 4 is a sectional view of a roller cage along line IV—IV of the embodiment according to FIG. 3.
Figure 5:
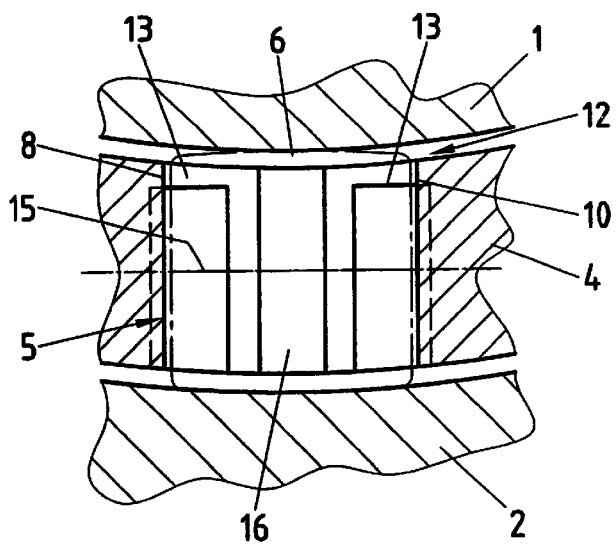
FIG. 5 is a sectional view of the roller cage along line V—V of the embodiment according to FIG. 3.

According to a first embodiment example, shown in FIGS. 3 to 5, each aperture 5 disposed in the roller cage 4 has a substantially rectangular cross-section. This rectangular cross-section is formed by four side faces 7, 8, 9, and 10.

A recess 11 is provided in each of the four corner regions of the aperture 5 formed by the four side faces 7, 8, 9, and 10. Each recess 11 has substantially the shape of a half-cylinder. Provided on the inside edge area 12 of the aperture 5 in the region of the recesses 11 are collar-shaped projections 13, the front edges 14 of which run substantially in diagonal direction over the corner region. By means of these collar-shaped projections the roller 6 is held in the aperture 5, so that it cannot come out of the aperture 5 toward the inside of the roller cage 4, i.e. in the direction of the guide pillar 1.

Provided on the side faces 7 and 9, which run parallel to the longitudinal axis 15 of the roller 6, is one further recess 16 each. This recess also has a cylindrical surface.

After the roller 6 has been inserted into the aperture 5, the material of the roller cage 4 is plastically deformed on the outside edge region 17 of the aperture 5 in the region of the side faces 7 and 9 which run parallel to the axis 15 of the roller 6. This takes place by pressing a rectangular stamp into the material of the roller cage 4 in such a way that a protruding edge 18 is formed, which protrudes over the surface of the side faces 7 and 9. Shown deformed in this way in FIGS. 3 and 4 is just one side (side face 7). The roller 6 is held in the aperture 5 by means of this protruding edge 18.

As can be seen from FIG. 5, the roller 6 has a barrel-shaped body. This means that the bearing region, which supports itself on the guide pillar 1 and on the plate 2, is situated in the central region of the roller 6. By means of the further recesses 16, which have the effect that the protruding edge 18 is also set back in this central region, the roller 6, with its bearing region, does not come into contact with the protruding edges 18 and the two side faces 7 and 9. Since the collar-shaped projections 13 are located in the corner regions of the aperture 5, these also do not come into contact with the bearing face of the roller 6. Achieved thereby is that the bearing area of the roller 6 is free of the roller cage 4, and therefore is not subjected to any additional attrition owing to abrasive rubbing.

The apertures 5 are put in the roller cage 4 by a high-speed milling machine by means of rough drilling of a hole and subsequent milling out of the contour, as has been previously described, using a single milling tool. This milling out of the apertures 5 in the roller cage 4 can be carried out with very high precision, whereby the play of the roller 6 in the aperture 5 can be kept minimal. A precise guiding of the roller 6 is thereby achieved, which also has a positive effect with regard to minimal wear and tear on the roller. Through the milling out, a minimal surface roughness is obtained, whereby the abrasive rubbing between roller and side walls can be reduced.

Figure 6:
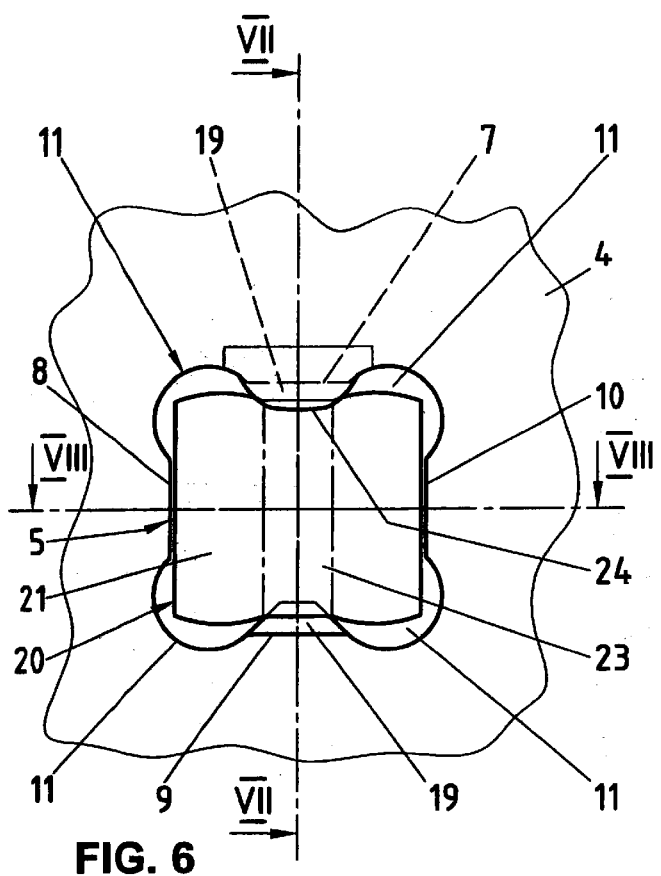
FIG. 6 is a top view of a detail of a further embodiment example of a roller cage with an aperture and roller inserted therein.
Figure 7:
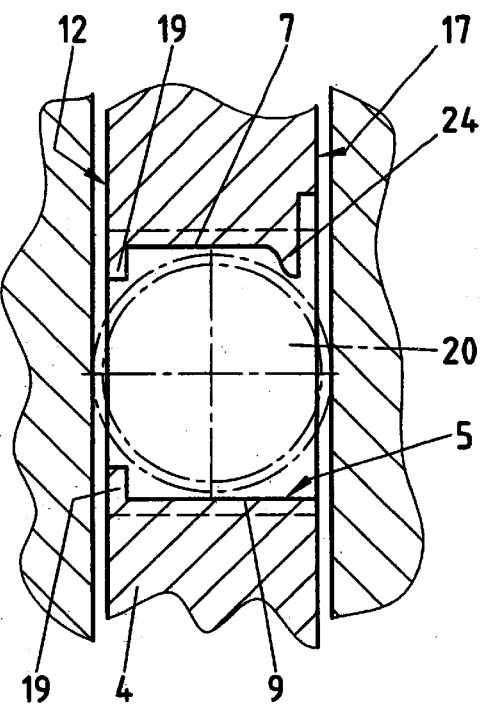
FIG. 7 is a sectional view of the roller cage along line VII—VII of the embodiment according to FIG. 6.
Figure 8:
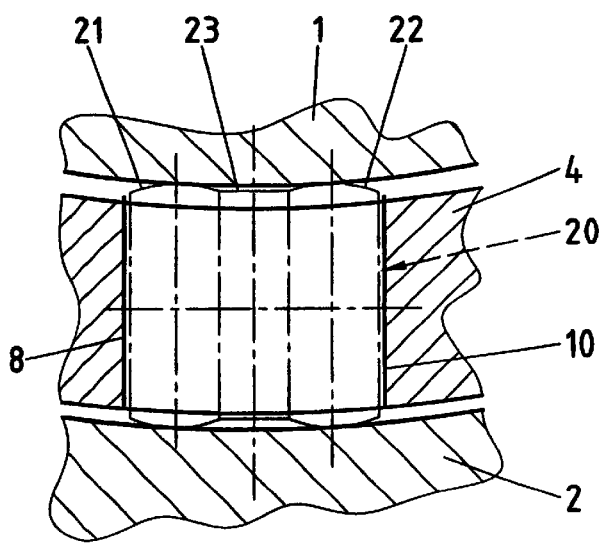
FIG. 8 is a sectional view of the roller cage along line VIII—VIII of the embodiment according to FIG. 6.

The second embodiment example, as is represented in FIGS. 6 to 8, shows an aperture 5, as can be made in the roller cage 4, which has also been provided with a recess 11 in the corner regions of the side faces 7 to 10. These recesses 11 also have the shape of a half-cylinder. The collar-shaped projections 19, which are provided on the inside edge region 12 of the aperture 5, run along the two side faces 7 and 9, and are limited laterally by the recesses 11. The roller 20, inserted into the thus designed aperture 5, has two cambered faces 21 and 22, which each form the side region of the roller 20. The middle region 23 is set back over the entire circumference of the roller 20, owing to these cambered surfaces 21 and 22.

As can be seen from FIG. 8 in particular, the cambered surfaces in this roller 20 form the bearing regions, by means of which this roller 20 supports itself on the guide pillar 1 and the plate 2. Ensured by means of the recesses 11 and the collar-shaped projections 19, provided on the side faces 7 and 9 between the recesses, is that the bearing regions of the roller 20 never come into contact with the roller cage 4.

After the roller 20 has been inserted into the aperture 5, the material of the roller cage is pressed in and plastically deformed on the outer edge region 17 of the aperture 5 along the side faces 7 and 9 between the recesses 11, in the same way as has been described with respect to the preceding embodiment example. An edge 24 is thereby formed protruding over the surface of the side faces 7 and 9. This protruding edge 24 is limited laterally by the recesses 11, whereby this protruding edge 24, too, comes into contact with the roller in its middle area 23, and does not come into contact with the bearing region. The plastic deformation of the material of the roller cage 4 to form the protruding edge 24 is carried out with a substantially rectangular stamp, as can be seen in FIGS. 6 and 7, only one side with the deformed state being shown.

Also these apertures 5 are made in the roller cage 4 by rough drilling and then subsequent milling out of the desired contour. The milling out likewise takes place in a high-speed milling machine; however, this could also be carried out with a milling tool. Attained here, too, are the advantages as have been described with respect to the preceding embodiment example, which result in particular from the high precision and the minimal surface roughness, whereby the play of the roller is kept minimal here too, and thus an exact placement of the roller is ensured. All of this serves to improve the life of the respectively equipped longitudinal guiding devices.

What is claimed is:

1. A roller cage having roller bearings mounted therein to provide a longitudinal lead between a guiding part and guided part, said roller cage having inside and outside faces and having a plurality of substantially rectangular apertures formed therein by four side faces and by semi-cylindrical recesses at corner regions of each aperture to define inside and outside perimeters with said inside and outside faces, a roller bearing in each of said apertures, said inside perimeter having projections which extend over at least part of the circumference of said roller bearing, at least one of two side faces which extend parallel to a longitudinal axis of said roller bearing having a deformed portion along said outside perimeter such that a protruding edge is formed over at least part of the circumference of said roller bearing; and wherein said projections extend between adjacent side faces and diagonally across said recesses.

2. The roller cage according to claim 1 wherein said roller bearing has cambered end portions and a recessed mid-portion.

3. The roller cage according to claim 1 wherein said projections extend from said two side faces.

4. The roller cage according to claim 1 wherein recesses are provided in said two side faces.

5. The roller cage according to claim 1 wherein the roller bearing has a cambered surface.

6. The roller cage according to claim 1 wherein each roller bearing being located primarily within the respective aperture.

7. The roller cage according to claim 1 wherein the longitudinal axis of each roller bearing being located within the respective axis.

8. The roller cage according to claim 1 wherein the protruding edge extends substantially perpendicular to the side face for which it was deformed.

9. A roller cage having roller bearings mounted therein to provide a longitudinal lead between a guiding part and a guided part, said roller cage having inside and outside faces and having a plurality of substantially rectangular apertures formed therein by four side faces and by semicylindrical recesses at corner regions of each aperture to define inside and outside perimeters with said inside and outside faces, a roller bearing in each of said apertures, said inside perimeter having projections which extend over at least part of the circumference of said roller bearing, at least one of two side faces which extend parallel to a longitudinal axis of said roller bearing having a deformed portion along said outside perimeter such that a protruding edge is formed over at least part of the circumference of said roller bearing, wherein said roller bearing has cambered end portions and a recessed mid-portion.

* * * * *